(12) United States Patent
Hashimoto et al.

(10) Patent No.: US 12,482,604 B2
(45) Date of Patent: Nov. 25, 2025

(54) MULTILAYER CERAMIC CAPACITOR

(71) Applicant: Murata Manufacturing Co., Ltd., Nagaokakyo (JP)

(72) Inventors: Hideyuki Hashimoto, Nagaokakyo (JP); Takehisa Sasabayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 95 days.

(21) Appl. No.: 18/608,999

(22) Filed: Mar. 19, 2024

(65) Prior Publication Data

US 2024/0222022 A1 Jul. 4, 2024

Related U.S. Application Data

(63) Continuation of application No. PCT/JP2022/035444, filed on Sep. 22, 2022.

(30) Foreign Application Priority Data

Sep. 28, 2021 (JP) .................................. 2021-158284

(51) Int. Cl.
*H01G 4/12* (2006.01)
*H01G 4/224* (2006.01)
*H01G 4/30* (2006.01)

(52) U.S. Cl.
CPC ........... *H01G 4/1227* (2013.01); *H01G 4/224* (2013.01); *H01G 4/306* (2013.01)

(58) Field of Classification Search
CPC ....... H01G 4/1227; H01G 4/224; H01G 4/306
See application file for complete search history.

(56) References Cited

U.S. PATENT DOCUMENTS 6,245,433 B1 6/2001 Nakamura et al.
2002/0072464 A1* 6/2002 Nakamura .............. B32B 18/00
501/137

(Continued)

FOREIGN PATENT DOCUMENTS

JP 3334607 B2 10/2002
JP 2015062216 A 4/2015
KR 20240038160 A 3/2024

OTHER PUBLICATIONS

International Search Report in PCT/JP2022/035444, mailed Nov. 1, 2022, 3 pages.

(Continued)

*Primary Examiner* — Michael P Mcfadden
(74) *Attorney, Agent, or Firm* — Keating & Bennett, LLP

(57) ABSTRACT

A multilayer ceramic capacitor includes dielectric ceramic layers and inner electrode layers. The dielectric ceramic layers include crystal grains including a perovskite oxide including at least one A-site element and at least one B-site element. When a cross-section of the dielectric ceramic layers is observed using a scanning transmission electron microscope, the dielectric ceramic layers include grains, on which a plane of a perovskite structure is observed, as crystal grains. The grains, when subjected to compositional analysis by energy dispersive x-ray spectroscopy, have an atom-distributed region in which a concentration of the A-site element or B-site element (c) subtracted from a maximum concentration of the element ($c_{max}$) ($\Delta c = c_{max} - c$) is about 2 atm % or less, at one or more atomic sites in the grains, and an area of the atom-distributed region ($S_{\Delta c \leq 2\%}$) is about 0.050 nm² or less.

20 Claims, 9 Drawing Sheets

(56) References Cited

U.S. PATENT DOCUMENTS

| | | | |
|---|---|---|---|
| 2004/0169967 A1* | 9/2004 | Konaka | C04B 35/4682 |
| | | | 361/15 |
| 2009/0059471 A1* | 3/2009 | Fukuda | C04B 35/4682 |
| | | | 264/615 |
| 2015/0055273 A1 | 2/2015 | Endo et al. | |
| 2018/0218837 A1* | 8/2018 | Hirose | H01G 4/1227 |
| 2018/0222801 A1* | 8/2018 | Hirose | C04B 35/462 |
| 2020/0266264 A1 | 8/2020 | Kim et al. | |
| 2022/0130608 A1* | 4/2022 | Mizuno | H01G 4/1209 |
| 2022/0177371 A1* | 6/2022 | Chung | H01G 4/248 |
| 2022/0415576 A1* | 12/2022 | Tsushima | H01G 4/012 |
| 2024/0274357 A1 | 8/2024 | Hashimoto et al. | |

OTHER PUBLICATIONS

Written Opinion in PCT/JP2022/035444, mailed Nov. 1, 2022, 3 pages.

* cited by examiner

MULTILAYER CERAMIC CAPACITOR

CROSS REFERENCE TO RELATED APPLICATIONS

This application claims the benefit of priority to Japanese Patent Application No. 2021-158284 filed on Sep. 28, 2021 and is a Continuation Application of PCT Application No. PCT/JP2022/035444 filed on Sep. 22, 2022. The entire contents of each application are hereby incorporated herein by reference.

BACKGROUND OF THE INVENTION

1. Field of the Invention

The present invention relates to multilayer ceramic capacitors.

2. Description of the Related Art

As mobile phones and other electronic devices become smaller, and CPUs become faster, the demand for multilayer ceramic capacitors (MLCCs) is becoming increasingly higher. A multilayer ceramic capacitor has a structure in which dielectric ceramic layers and inner electrode layers are stacked alternately and has a large electrostatic capacitance despite its compact size due to the high-dielectric-constant dielectric ceramic layers formed as thin layers. Although multilayer ceramic capacitors with various materials are known, ones made using a barium titanate ($BaTiO_3$) compound in the dielectric ceramic layers and a non-precious metal, such as nickel (Ni), in the inner electrode layers are commonly used because they are inexpensive and exhibit high characteristics.

To achieve a compact size and a large capacitance of a multilayer ceramic capacitor, it is important to form the dielectric ceramic layers as thin layers. Advancing the thinning of dielectric ceramic layers, however, causes the problem of reduced reliability resulting from a shortened life of the insulation resistance between the inner electrode layers. To address such problems, a technology has been proposed in which the extension of the life of insulation resistance and improvement in reliability are sought by adding additives, such as rare earth elements (REs) and magnesium (Mg), to dielectric ceramic layers made of a $BaTiO_3$ compound.

For example, in Japanese Patent No. 3334607, a dielectric ceramic composition is disclosed that includes a base component including barium titanate, at least one selected from europium oxide, gadolinium oxide, terbium oxide, dysprosium oxide, holmium oxide, erbium oxide, thulium oxide, and ytterbium oxide, barium zirconate, magnesium oxide, and manganese oxide and represented by a particular formula (See, for example, Claim 1 of Japanese Patent No. 3334607). Japanese Patent No. 3334607 also discloses that this ceramic composition is applied to the dielectric ceramic layers of a multilayer ceramic capacitor having inner electrodes made of nickel or a nickel alloy and that the resulting capacitor exhibits a high product of insulation resistance and electrostatic capacitance (C×R), has high dielectric strength, and is superior in weather resistance, such as durability at high temperatures and resistance in a humid environment, when used under a strong electric field (See, for example, Claim 4 and [0007] of Japanese Patent No. 3334607).

As can be seen from the foregoing, it has been proposed to seek an improvement in the reliability of multilayer ceramic capacitors by adding additives, such as rare earth elements (REs), to their dielectric ceramic layers. Such known approaches still have room for refinement, although effective to some extent.

The inventors of example embodiments of the present invention conducted extensive research in view of such problems. As a result, for multilayer ceramic capacitors that include dielectric ceramic layers including a perovskite oxide as their base component and inner electrode layers, the inventors of example embodiments of the present invention directed their attention to distributed regions, which represent the regions occupied by the atoms included in the perovskite oxide. Through this, the inventors of example embodiments of the present invention discovered that by controlling these distributed regions, the high-temperature operating life of the dielectric ceramic layers can be extended, and this enables an increase in the reliability of the multilayer ceramic capacitors.

SUMMARY OF THE INVENTION

Example embodiments of the present invention provide multilayer ceramic capacitors that each have a long high-temperature operating life and superior reliability.

A range expressed using ("from" and) "to" herein includes the values at both ends. In other words, "(from) X to Y" is synonymous with "X or more and Y or less."

According to an example embodiment of the present invention, a multilayer ceramic capacitor includes a first primary surface and a second primary surface opposite to each other in a thickness direction, a first side surface and a second side surface opposite to each other in a width direction, and a first end surface and a second end surface opposite to each other in a length direction, and a body including a plurality of dielectric ceramic layers and a plurality of inner electrode layers stacked in the thickness direction and a pair of outer electrodes provided at the first end surface and the second end surface and coupled to the plurality of inner electrode layers, wherein the plurality of dielectric ceramic layers include crystal grains including a perovskite oxide including at least one A-site element and at least one B-site element, when a cross-section of the plurality of dielectric ceramic layers is observed using scanning transmission electron microscope, the plurality of dielectric ceramic layers include {100} grains, on which a {100} plane of a perovskite structure is observed, as crystal grains, and when compositional analysis of the {100} grains is performed by energy dispersive x-ray spectroscopy on the cross-section, the {100} grains include an atom-distributed region in which a concentration of the A-site element or B-site element (c) subtracted from a maximum concentration of the element ($c_{max}$) ($\Delta c = c_{max} - c$) is about 2 atm % or less, at one or more atomic sites in the grains, and an area of the atom-distributed region ($S_{\Delta c \leq 2\%}$) is about 0.050 $nm^2$ or less.

According to example embodiments of the present invention, multilayer ceramic capacitors achieve long high-temperature operating life and superior reliability.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described below with reference to the drawings. The present invention is not limited to the following example embodiment. Various modifications or combinations of various elements, features or characteristics of the example embodiments are possible within the scope of the present invention.

(1) MULTILAYER CERAMIC CAPACITOR

A multilayer ceramic capacitor according to the present example embodiment includes a first primary surface and a second primary surface opposite to each other in a thickness direction, a first side surface and a second side surface opposite to each other in a width direction, and a first end surface and a second end surface opposite to each other in a length direction and includes a body including multiple dielectric ceramic layers and multiple inner electrode layers stacked in the thickness direction and a pair of outer electrodes provided at the first end surface and the second end surface, with one outer electrode at each end surface, and coupled to the multiple inner electrode layers. For the multilayer ceramic capacitor, the dielectric ceramic layers include crystal grains including a perovskite oxide including at least one A-site element and at least one B-site element. When a cross-section of the dielectric ceramic layers is observed using scanning transmission electron microscope, the dielectric ceramic layers include {100} grains, on which the {100} plane of the perovskite structure is observed, as crystal grains. When compositional analysis of a {100} grain is performed by energy dispersive x-ray spectroscopy on the cross-section, the {100} grain includes an atom-distributed region, which is a region in which the concentration of one A-site element or B-site element (c) subtracted from the maximum concentration of the element ($c_{max}$) ($\Delta c = c_{max} - c$) is about 2 atm % or less, and the area of this atom-distributed region ($S_{\Delta c \leq 2\%}$) is about 0.050 nm² or less.

Figure 1:
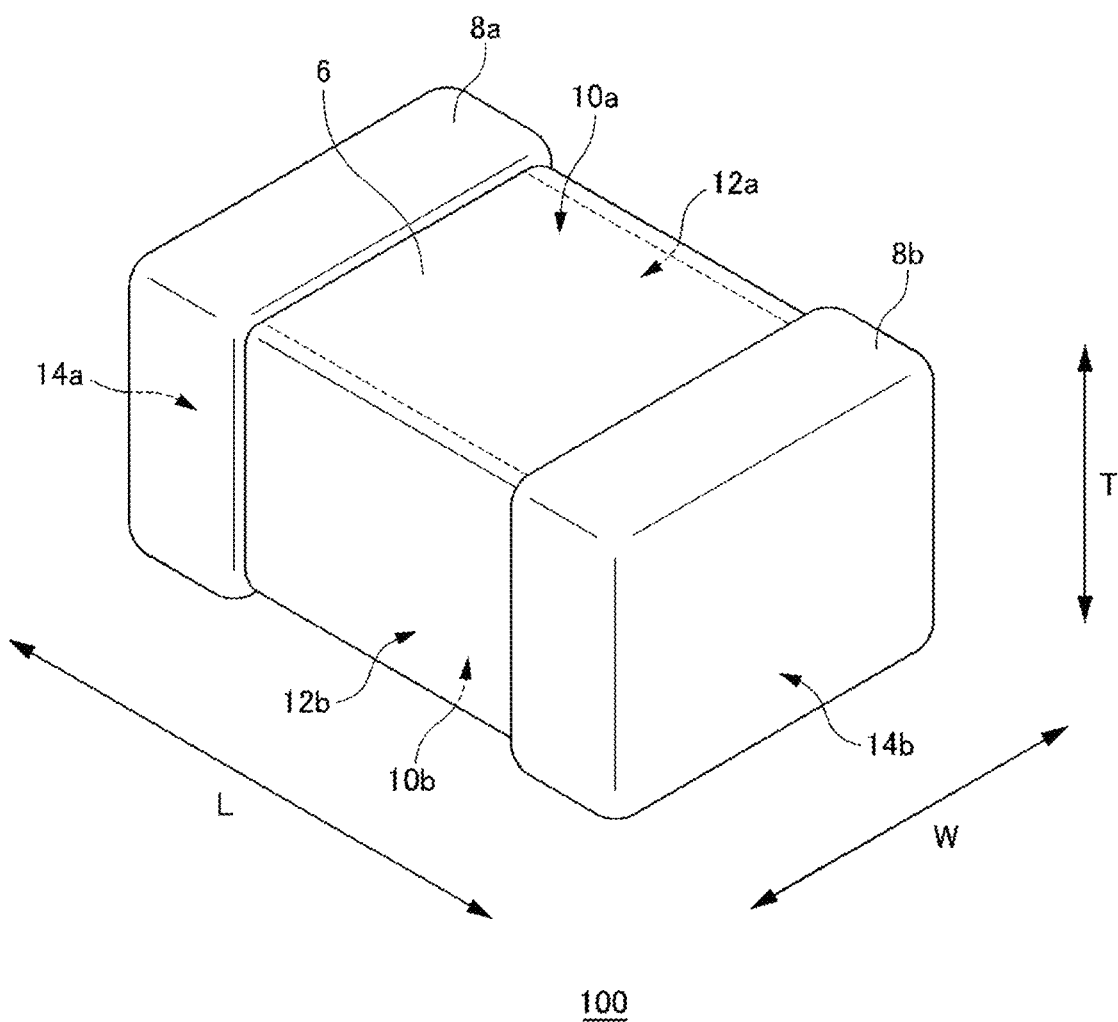
FIG. 1 is a perspective view illustrating an external shape of a multilayer ceramic capacitor according to an example embodiments of the present invention.
Figure 2:
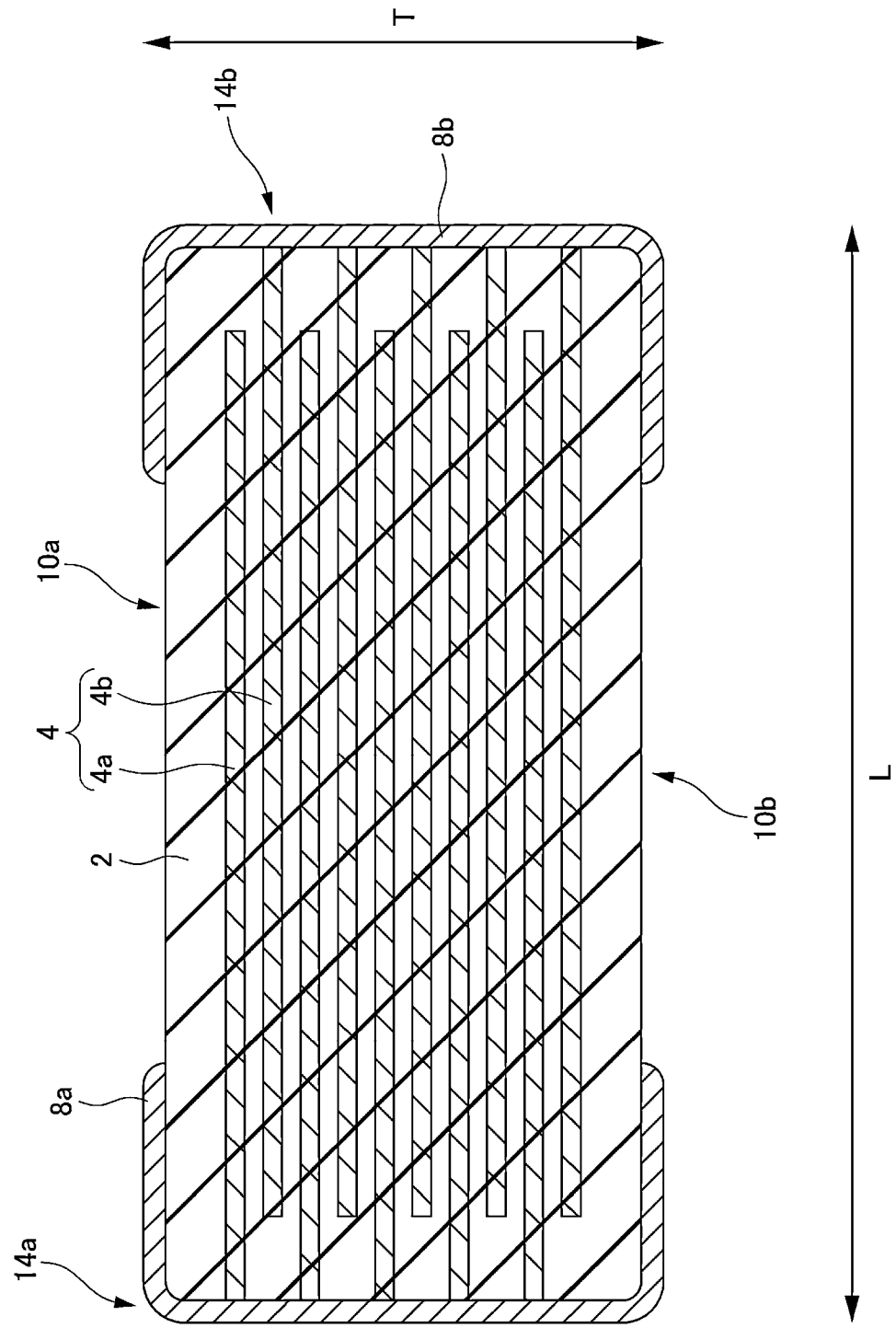
FIG. 2 is a cross-sectional view schematically illustrating the internal structure of a multilayer ceramic capacitor according to an example embodiments of the present invention.
Figure 3:
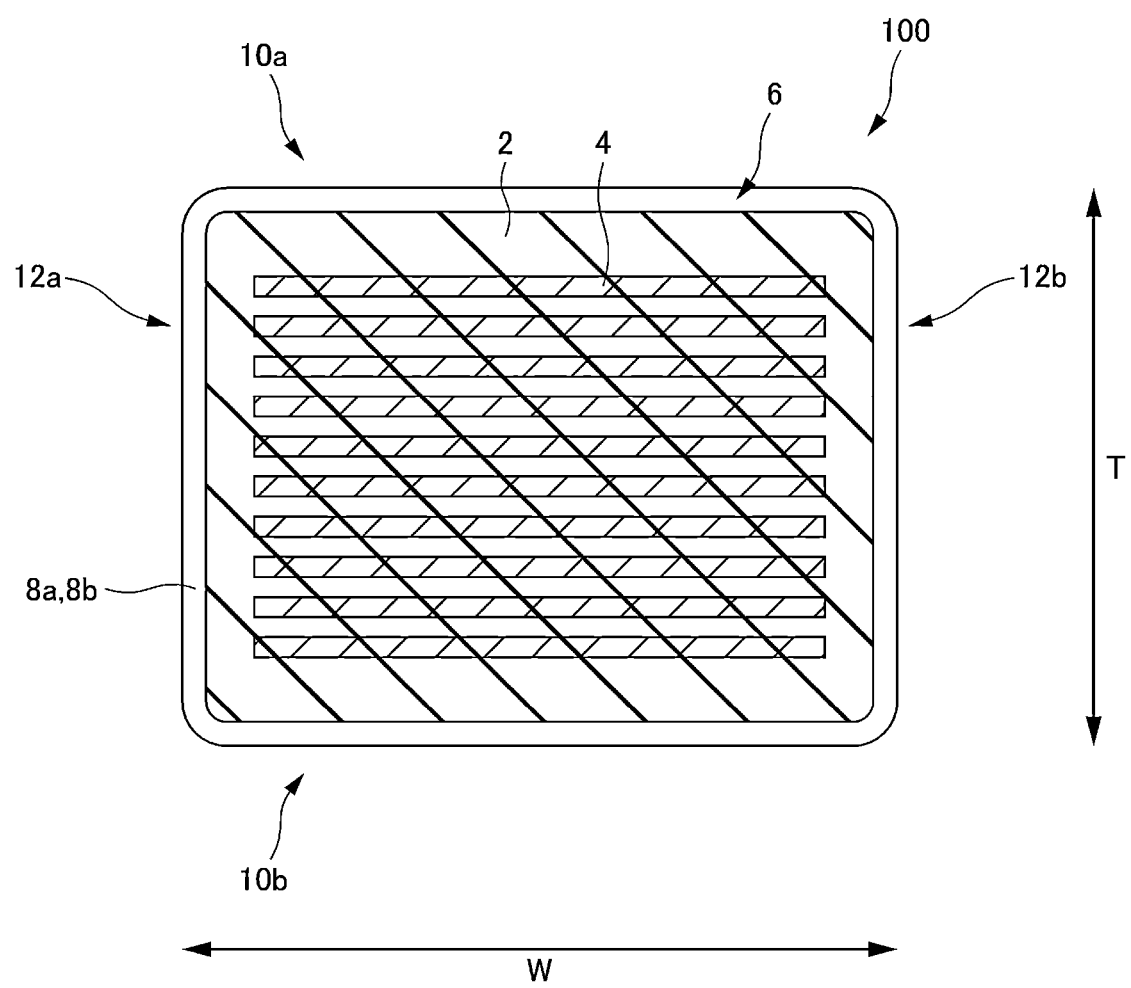
FIG. 3 is a cross-sectional view schematically illustrating the internal structure of a multilayer ceramic capacitor according to an example embodiments of the present invention.

A configuration of a multilayer ceramic capacitor will be described with reference to FIGS. 1 to 3. FIG. 1 is a perspective view illustrating the external shape of the multilayer ceramic capacitor. FIGS. 2 and 3 are cross-sectional views schematically illustrating the internal structure of the multilayer ceramic capacitor. The multilayer ceramic capacitor (100) includes a body (6) including multiple dielectric ceramic layers (2) and multiple inner electrode layers (4) stacked together and a pair of outer electrodes (8a and 8b) provided at the two end surfaces (14a and 14b) of this body (6). The multilayer ceramic capacitor (100) and the body (6) are cuboid or substantially cuboid in shape. Being substantially cuboid includes not only being a cuboid but also being a cuboid with rounded corners and/or edges. The multilayer ceramic capacitor (100) and the body (6) include a first primary surface (10a) and a second primary surface (10b) opposite to each other in a thickness direction T, a first side surface (12a) and a second side surface (12b) opposite to each other in a width direction W, and a first end surface (14a) and a second end surface (14b) opposite to each other in a length direction L. In this context, the thickness direction T refers to the direction in which the multiple dielectric ceramic layers (2) and the multiple inner electrode layers (4) are stacked together. The length direction L refers to the direction perpendicular or substantially perpendicular to the end surfaces (14a and 14b), at which the outer electrodes (8a and 8b) are provided. The width direction W is the direction perpendicular or substantially perpendicular to the thickness direction T and the length direction L. A plane that includes the thickness direction T and the width direction W is defined as a WT plane, a plane that includes the width direction W and the length direction L is defined as an LW plane, and a plane that includes the length direction L and the thickness direction T is defined as an LT plane.

The outer electrodes (8a and 8b) include a first outer electrode (8a) provided at the first end surface (14a) and a second outer electrode (8b) provided at the second end surface (14b). The first outer electrode (8a) is not confined to the first end surface (14a), and may extend to a portion of the first primary surface (10a), second primary surface (10b), first side surface (12a), and second side surface (12b). The second outer electrode (8b) is not confined to the second end surface (14b), and may extend to a portion of the first primary surface (10a), second primary surface (10b), first side surface (12a), and second side surface (12b). The first outer electrode (8a) and the second outer electrode (8b), however, are not in contact with each other. Instead, they are electrically separated.

The inner electrode layers (4) include multiple first inner electrode layers (4a) and multiple second inner electrode layers (4b). The first inner electrode layers (4a) extend to the first end surface (14a) and are electrically coupled to the first outer electrode (8a). The second inner electrode layers (4b), furthermore, extend to the second end surface (14b) and are electrically coupled to the second outer electrode (8b). A first inner electrode layer (4a) and a second inner electrode layer (4b) facing each other with a dielectric ceramic layer (2) therebetween are not electrically coupled together. When a voltage is applied across the first inner electrode layers (4a) and the second inner electrode layers (4b) through the outer electrodes (8a and 8b), therefore, electric charge is stored. An electrostatic capacitance results from the stored electric charge, and it allows the capacitor to perform a function as a capacitive element.

The dimensions of the multilayer ceramic capacitor (100) are not particularly limited. However, for example, the dimension in the length direction L is preferably about 0.2 mm or more and about 1.2 mm or less, the dimension in the width direction W is preferably about 0.1 mm or more and about 0.7 mm or less, and the dimension in the stacking direction T is preferably about 0.1 mm or more and about 0.7 mm or less.

Dielectric Ceramic Layers

The dielectric ceramic layers include crystal grains. These crystal grains are grains defining and functioning as the base component of the dielectric ceramic layers (base crystal grains) and include a perovskite oxide including at least one A-site element and at least one B-site element. In other words, the dielectric ceramic layers are sintered polycrystals including a perovskite oxide as their base component. A perovskite oxide has a composition represented by the general formula: $ABO_3$ and takes cubic-like crystal structures, such as cubic, tetragonal, orthorhombic, and rhombohedral, at room temperature. Each of the atoms of the A-site element (hereinafter "A-site atoms") and the atoms of the B-site element (hereinafter "B-site atoms") occupies the A-site or B-site in the perovskite structure in its ionized state. Examples of A-site elements include elements with relatively large ionic sizes, such as, for example, barium (Ba), calcium (Ca), and strontium (Sr), and examples of B-site elements include, for example, elements with relatively small ionic sizes, such as titanium (Ti), zirconium (Zr), and hafnium (Hf).

Figure 4:
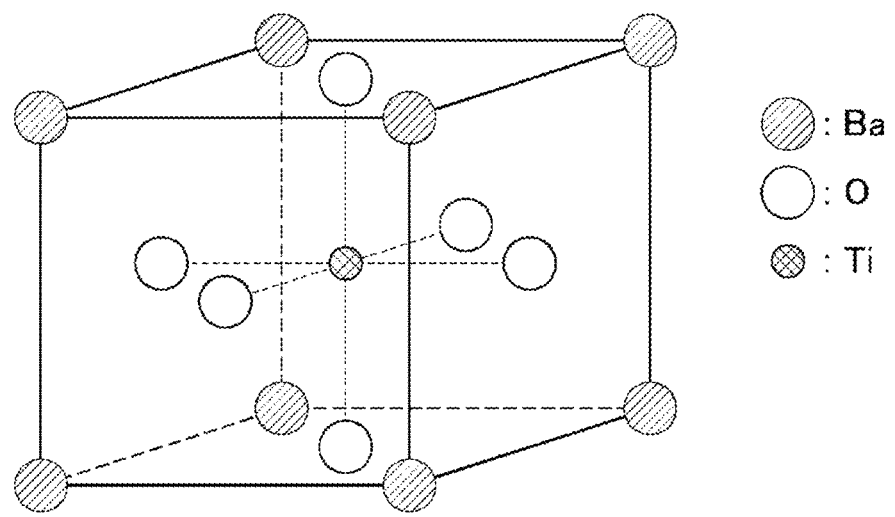
FIG. 4 illustrates a unit cell in a perovskite oxide crystal.

The crystal structure of a perovskite oxide is illustrated in FIG. 4. Ionized B-site atoms (hereinafter "B-site ions"), such as, for example, $Ti^{4+}$ occupy the body-center position of the unit cell, surrounded by six oxygen ions ($O^{2-}$) positioned at the surface-center positions and forming a regular octahedron. Ionized A-site atoms (hereinafter "A-site ions"), such as, for example, $Ba^{2+}$ occupy the eight corners of the unit cell. The positively charged A-site ions and/or B-site ions become displaced to cause dielectric polarization, enabling the oxide to have paraelectric or ferroelectric properties. An ionized atom (ion) may be simply referred to as an "atom" herein.

The combination of the A-site element and the B-site element is not particularly limited as long as the perovskite structure is maintained. Each of the A-site element and the B-site element may include only one element or may include multiple elements in combination. In addition, the percentage of the perovskite oxide in the dielectric ceramic layers may be, for example, about 50% by mass or more, may be about 60% by mass or more, may be about 70% by mass or more, may be about 80% by mass or more, or may be about 90% by mass or more.

Preferably, the A-site element includes barium (Ba), and the B-site element includes titanium (Ti), for example. The perovskite oxide, therefore, may be, for example, a barium titanate ($BaTiO_3$) compound. $BaTiO_3$ has a large spontaneous polarization at room temperature and thus is a ferroelectric substance, which has a high dielectric constant. Through the use of a $BaTiO_3$ compound as the base component, therefore, it becomes possible to further increase the capacitance of the capacitor. Incidentally, $BaTiO_3$ compounds include not only $BaTiO_3$ but also compounds in which a subset of Ba atoms in $BaTiO_3$ have been replaced with at least one other A-site element, such as, for example, Sr and/or Ca, or compounds in which a subset of Ti atoms in $BaTiO_3$ have been replaced with at least one other B-site element, such as, for example, Zr and/or Hf. It is, however, preferable that the percentage of Ba in the A-site element is, for example, about 70% or more as a molar percentage, more preferably about 80% or more, even more preferably about 90% or more. The percentage of Ti in the B-site element, furthermore, is, for example, preferably about 70% or more as a molar percentage, more preferably about 80% or more, even more preferably about 90% or more. The A-site element may exclude substances other than Ba and inevitable impurity elements, and the B-site element may exclude substances other than Ti and inevitable impurity elements. In this context, the inevitable impurities are substances that unavoidably contaminate the oxide during its manufacturing process The dielectric ceramic layers may include extra components, or components other than the base component, as added components. Although not limited, examples of added components include rare earth elements (REs), manganese (Mn), magnesium (Mg), silicon (Si), aluminum (Al), and vanadium (V). Rare earth elements (REs) is a generic term for the elements that include the group consisting of scandium (Sc), with atomic number 21, yttrium (Y), with atomic number 39, and lanthanum (La), with atomic number 57, to lutetium (Lu), with atomic number 71, in the Periodic Table. For rare earth elements (REs), for example, one or more selected from the group consisting of yttrium (Y), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) are preferable, and dysprosium (Dy) is particularly preferable. The configuration in which the added components are present is not limited. They only need to be included in any of the crystal grains, grain boundaries, or triple points. When included in the crystal grains, the added components may occupy the A-site in the perovskite oxide ($ABO_3$), may occupy the B-site, or may occupy both sites simultaneously.

For the multilayer ceramic capacitor according to this example embodiment, the dielectric ceramic layers contain {100} grains as crystal grains. In this context, {100} grains are defined as crystal grains on which, when a cross-section of the dielectric ceramic layers is observed using a scanning transmission electron microscope (S-TEM), the {100} plane of the perovskite structure is observed in at least a portion of the cross-section. In other words, a subset or all of the crystal grains are {100} grains. For a {100} grain, the {100} plane only needs to be observed in at least a certain region. The cross-section is a plane that includes the thickness direction, or the direction in which the dielectric ceramic layers and the inner electrode layers are stacked together. The cross-section can also be described as a plane a perpendicular or substantially perpendicular from which is at right angles to the thickness direction, such as an LT plane or WT plane. Moreover, the {100} plane is a family of crystal lattice planes denoted by Miller indices and includes the six planes of the (100) plane, the (010) plane, the (001) plane, the (−100) plane, the (0-10) plane, and the (00-1) plane.

A scanning transmission electron microscope (S-TEM) is a device that scans a focused fine incident probe over a sample and observes its microscopic structure by converting transmitted electrons to a luminance signal. Due to advances in devices in recent years, the spatial resolution has improved to about 50 pm or less, for example. In terms of detection sensitivity, S-TEM is now capable of capturing structures even at the single-atom level. With S-TEM, various images can be observed using electrons scattered by the sample. Of such images, images obtained by detecting electrons with scattering angles larger than the convergence angle of the incident probe using an annular detector are annular dark-field (ADF) images. Of ADF images, furthermore, images with particularly large scattering angles are high angle annular dark-field (HAADF) images. Because the intensities of HAADFs correspond to the atomic number Z, HAADF images are superior in elemental discrimination. By analyzing a HAADF image in particular, therefore, positional data of elements can be evaluated with high accuracy.

The presence or absence and the percentage of {100} grains can be examined by acquiring an ADF image, a HAADF image, and/or an electron beam diffraction pattern for a central portion of the crystal grains of the dielectric ceramic layers and analyzing it/them. Specifically, during a S-TEM observation, an ADF image or HAADF image of a central portion of particular grains is obtained by nano beam electron diffraction (NBD). Then, when the {100} plane, based on the arrangement of the atoms of the perovskite oxide, is observed, the grains can be determined to be {100} grains. Alternatively, it is also possible to acquire an electron beam diffraction pattern by NBD and determine the grains to be {100} grains when only a periodic pattern based on the {100} plane is present in this electron beam diffraction pattern.

The S-TEM observation is performed on a cross-section that includes the direction along the thickness of the dielectric ceramic layers. More specifically, it is preferable to observe a region that is located in the middle of the dielectric ceramic layers in the length direction (L direction) and is at the center or approximate center of a plane that includes the width direction (W direction) and the thickness direction (T direction) (WT plane). The observation only needs to cover a region with a field of view of, for example, about 10 μm×about 10 μm or a region including 200 crystal grains. The S-TEM observation is conducted with the axis of the microscope held in an orientation vertical or substantially vertical to the cross-section of the dielectric ceramic layers and by inclining the cross-section of the dielectric ceramic layers within the range of about ±5° in that state. Then grains on which the {100} plane is observed when the angle of inclination falls within this range (about ±5°) are identified as {100} grains. In short, grains with the {100} plane exposed within the range of about ±5° from an axis vertical to the cross-section of the dielectric ceramic layers are {100} grains.

Figure 5:
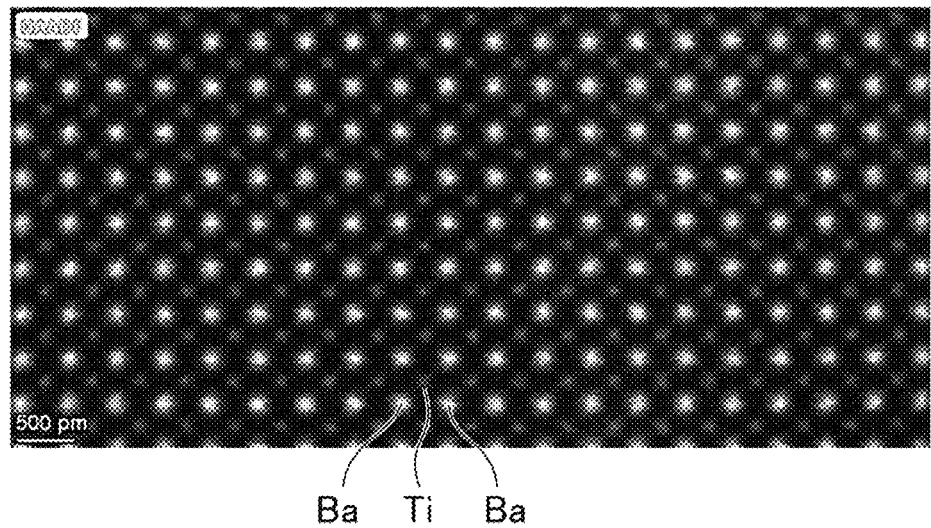
FIG. 5 presents a HAADF image of a cross-section of a dielectric ceramic layer.

{100} grains will be described in further detail based on actual measurement results. An example of a cross-sectional HAADF image of a {100} grain included in a dielectric ceramic layer of a multilayer ceramic capacitor according to the present example embodiment is presented in FIG. 5. This multilayer ceramic capacitor was made using barium titanate ($BaTiO_3$) in the dielectric ceramic layers. In FIG. 5, bright spots based on Ba and bright spots based on Ti are observed, and each set of bright spots forms a grid-shaped array of atoms (ions). The Ba bright spots, furthermore, has higher luminance than the Ti bright spots. This is because the atomic weight of Ba is greater than that of Ti.

For the multilayer ceramic capacitor according to the present example embodiment, the {100} grains in the aforementioned cross-section include an atom-distributed region at one or more atomic sites in the grains, and the area of this atom-distributed region ($S_{\Delta c \leq 2\%}$) is, for example, about 0.050 $nm^2$ or less. In this context, an atom-distributed region is a region that provides a measure of the spread of the positional distribution of an atom around a lattice point. Specifically, an atom-distributed region is a single region that is present inside a unit cell centered around one lattice point in an ADF or HAADF image and in which the differential atomic concentration (Δc) of the A-site element or B-site element corresponding to this lattice point is, for example, about 2 atm % or less. In this context, the differential atomic concentration (Δc) is the atomic concentration of the element (A-site element or B-site element) (c) subtracted from its maximum ($c_{max}$) ($c_{max}-c$) inside the unit cell.

In an ideal crystal, atoms or ions are, at absolute zero, present at the lattice points that they should occupy. At temperatures exceeding absolute zero, however, phonons arise, leading to thermal vibrations (lattice vibrations) of the atoms or ions around the lattice points. In a real crystal, defects such as lattice defects can occur, and this can cause atoms to be displaced to positions different from the lattice points. This is because the crystal field alters due to the defects. Consequently, the positional distribution of the atoms expands. To be more specific, when a unit cell centered around one certain lattice point is focused on, the concentration of the atom that should occupy this lattice point is maximized at the lattice point and decreases with increasing distance from the lattice point. If it is possible to quantitatively estimate the size of the atom-distributed region, therefore, the spread of atomic position distribution can be evaluated based on it.

By reducing the area of the atom-distributed region ($S_{\Delta c \leq 2\%}$), the high-temperature operating life of the multilayer ceramic capacitor is extended, and this enables reliability to be increased. Although the details of the mechanism behind this are unclear, the inventors of example embodiments of the present invention presume as follows. That is, in a real crystal, a large number of lattice defects, such as oxygen vacancies and atomic defects, are present. Among others, multilayer ceramic capacitors are manufactured through firing in a reducing atmosphere. In the dielectric ceramic layers included in them, therefore, a large number of oxygen vacancies should be present. These oxygen vacancies are believed to be a cause from which the high-temperature operating life of multilayer ceramic capacitors is shortened. The inventors of example embodiments of the present invention also believe that when a large number of oxygen vacancies or other lattice defects are present, the positional distribution of the elements expands because the defects result in lattice strains, and, as a result, the area of the atom-distributed region increases. When the area of the atom-distributed region is small, by contrast, lattice strains are reduced in number, and the high-temperature operating life is extended. The smaller the area of the atom-distributed region, the more preferable. For example, the area is preferably about 0.045 $nm^2$ or less, more preferably about 0.040 $nm^2$ or less, even more preferably about 0.035 $nm^2$ or less, particularly preferably about 0.030 $nm^2$ or less, the most preferably about 0.023 $nm^2$ or less. The lower limit is not particularly limited. For example, the area is about 0.001 $nm^2$ or more.

Figure 6:
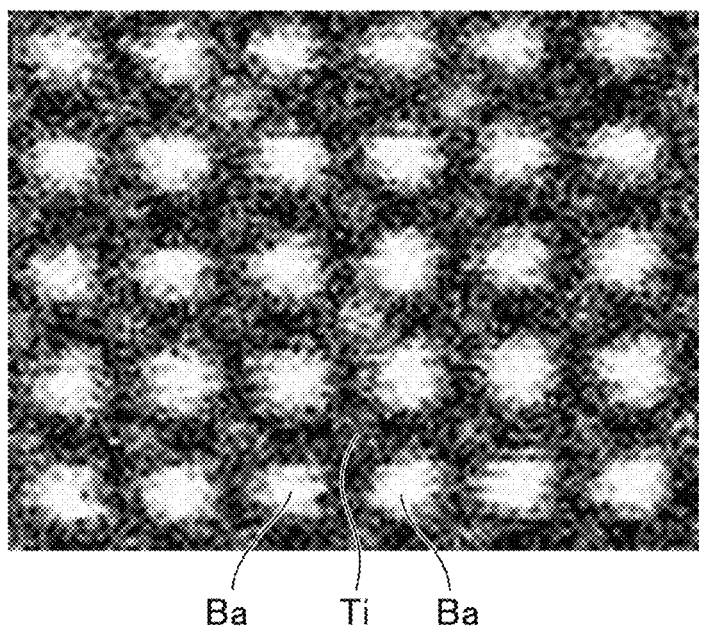
FIG. 6 presents a HAADF image of a cross-section of a dielectric ceramic layer.

The area of the atom-distributed region ($S_{\Delta c \leq 2\%}$) will be described in further detail based on actual measurement results. An example of a cross-sectional HAADF image of a {100} grain included in a dielectric ceramic layer of a multilayer ceramic capacitor according to the present example embodiment is presented in FIG. 5. A cross-sectional HAADF image of a multilayer ceramic capacitor obtained in the related art is shown in FIG. 6. Here, the multilayer ceramic capacitors according to the present example embodiment and in the related art were both made using barium titanate ($BaTiO_3$) in the dielectric ceramic layers. In both of FIGS. 5 and 6, bright spots based on Ba and bright spots based on Ti are observed, and each set of bright spots defines a grid-shaped array of atoms (ions). In the {100} grain according to the present example embodiment, however, the size of the bright spots is small. In the {100} grain in the related art, by contrast, the size of the bright spots is large. This is because in the {100} grain according to the present example embodiment, the regions in which ionized Ba and Ti atoms are distributed are concentrated in the vicinity of lattice points, but in the {100} grain in the related art, the Ba and Ti lattices are strained, leading to an expansion of the atom-distributed regions.

Figure 7:
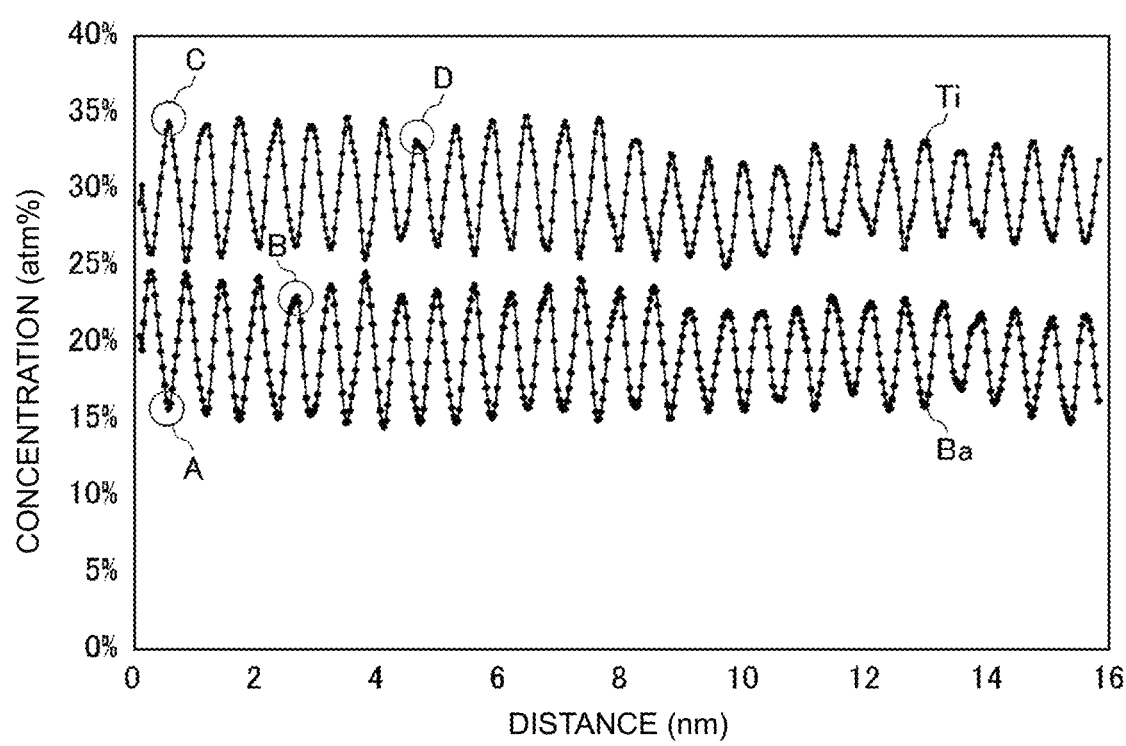
FIG. 7 is a graph that represents positional changes in Ba concentration and Ti concentration on a cross-section of a {100} grain.

An example of a method for measuring the area of the atom-distributed region ($S_{\Delta c \leq 2\%}$) will now be described. FIG. 7 represents positional changes in Ba concentration and Ti concentration on a cross-section of a {100} grain. This representation was obtained by performing compositional analysis along one straight line on the cross-section of the {100} grain by energy dispersive x-ray spectroscopy (EDX) and determining the atomic concentrations obtained through this analysis as functions of position (distance). The Ba concentration and the Ti concentration change periodically. Reflecting the positions of Ba and Ti in the crystal, the Ti concentration is minimized at positions at which the Ba concentration is maximized (peaks), and the Ti concentration is maximized at positions at which the Ba concentration is minimized.

Figure 8:
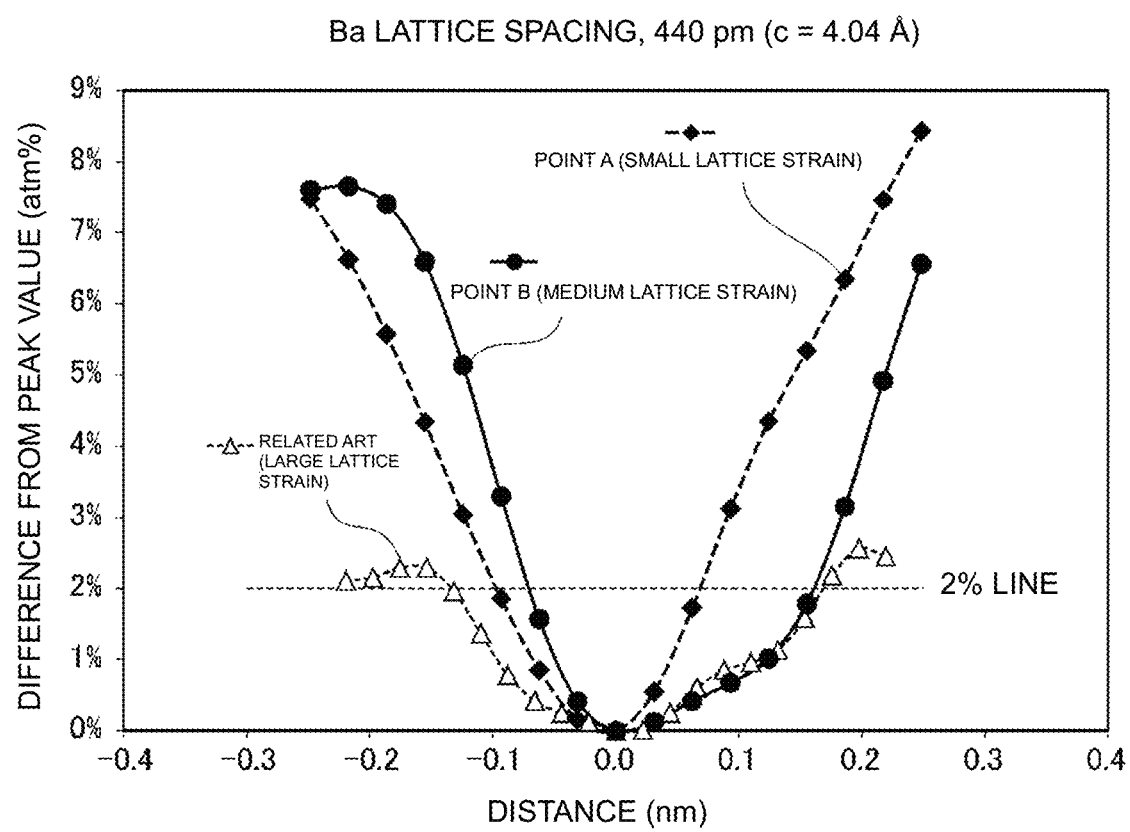
FIG. 8 is a graph that represents positional changes in differential Ba concentration for a one-lattice length.

FIG. 8 was obtained by setting a position in FIG. 7 at which the Ba concentration (c) is maximized ($c_{max}$) as the origin and mapping the differential Ba concentration ($\Delta c = c_{max} - c$) in a graph at about 30-pm intervals for a one-lattice length. In the {100} grain according to the present example embodiment, the positional changes in differential Ba concentration are sharp. In other words, the Ba concentration rapidly decreases as the measuring point moves away from the origin. In the {100} grain in the related art, by contrast, the differential Ba concentration is broad. This trend reflects the sizes of the bright spots in the HAADF images. If the distance from the origin of the position in the graph in FIG. 8 at which the differential Ba concentration ($\Delta c$) is about 2 atm % is determined and if the area of a circle having a radius equal or substantially equal to this distance is calculated, this area can be considered as the area of the regions in which Ba atoms are distributed ($S_{\Delta c \leq 2\%}$).

Specifically, in the graph in FIG. 8, a line at which the differential Ba concentration ($\Delta c$) is about 2 atm % is drawn parallel or substantially parallel to the horizontal axis. Then the distances from the vertical axis of the two points at which this line intersects the differential Ba concentration graph (point a and point b) are read and designated $d_a$ and $d_b$, respectively. The area of the atom-distributed region ($S_{\Delta c \leq 2\%}$) can then be determined according to formulae (1) and (2) below.

$$d = \frac{d_a + d_b}{2} \quad (1)$$

$$s_{\Delta c \leq 2\%} = \pi \cdot d^2 \quad (2)$$

Preferably, in the aforementioned cross-section, or a cross-section that includes the direction along the thickness of the dielectric ceramic layers, the percentage by number of {100} grains in the crystal grains is, for example, about 4% or more. By increasing the percentage of {100} grains, the dielectric constant of the dielectric ceramic layers can be increased. Although the details of the mechanism behind this are unclear, the inventors of example embodiments of the present invention believe that the orientation of the crystal grains included in the dielectric ceramic layers may possibly be involved. To be more specific, for the perovskite oxide crystals of the crystal grains, the six planes, such as the (100) plane, defining the {100} plane in the cubic crystal structure are all equivalent. When the percentage by number of {100} grains in the case in which the crystal grains are randomly oriented is estimated based on this fact using the concept of solid angles, their percentage is only approximately 1.5%. Dielectric ceramic layers in which the percentage by number of {100} grains is about 4% or more, therefore, can be deemed to have oriented crystal grains and a high percentage of {100} grains compared with that in the case of random orientation. The inventors of example embodiments of the present invention believe that as a result of C-axis orientation of $BaTiO_3$ in the direction vertical or substantially vertical to the inner electrodes, the dielectric constant increases.

The higher the percentage by number of {100} grains, the more preferable. The percentage by number is, for example, preferably about 10% or more, more preferably about 15% or more, even more preferably about 20% or more. The upper limit to the percentage by number is not particularly limited.

Preferably, in the aforementioned cross-section, the {100} grains include an atom-arrayed region, and the average percentage by area of the atom-arrayed region is, for example, about 10% or more on the cross-sections of the {100} grains. In this context, an atom-arrayed region is defined as a region in which the atomic arrangement of the perovskite oxide, or a regular arrangement of A-site atoms and B-site atoms, is observed in a S-TEM observation. A {100} grain may include a region in which the {100} plane is observed, or an atom-arrayed region, in its central portion while having an atom-disarrayed region, in which the {100} plane is not observed, around it. Specifically, the {100} plane may be observed in a central portion, with the {100} plane not observed in an outer portion. In the atom-arrayed region, a regular arrangement of the A-site atoms and B-site atoms constituting the perovskite oxide is observed. In the atom-disarrayed region, by contrast, no regular arrangement is observed. This is because in the atom-disarrayed region, the strains on the lattices of the A-site atoms and the B-site atoms are particularly large, resulting in structural irregularity.

By increasing the percentage of the atom-arrayed region, strains on the crystals are reduced, enabling the reliability of the multilayer ceramic capacitor to be improved. The average percentage by area of the atom-arrayed region is, for example, more preferably about 20% or more, even more preferably about 30% or more, and particularly preferably about 40% or more. The upper limit to the average percentage by area is not particularly limited. Typically, however, the percentage is, for example, about 50% or less.

The percentage by area of the atom-arrayed region can be determined through the S-TEM observation described above. That is, for each {100} grain, an ADF image or HAADF image of the entire grain is acquired by NBD, and the region in which an array of atoms is observed (atom-arrayed region) is identified on the acquired image. Then the percentage by area of the atom-arrayed region on the cross-section of the grain is calculated, and the average can be determined as the average percentage by area.

For the dielectric ceramic layers, their thickness is, for example, preferably about 1.0 μm or less, and particularly preferably about 0.4 μm or less. Through the formation of the dielectric ceramic layers as thin layers, it becomes possible to increase in the capacitance of the multilayer ceramic capacitor. When the dielectric ceramic layers are formed excessively thin, however, it becomes difficult to control decreases in insulating properties. The thickness of the dielectric ceramic layers is preferably, for example, 0.15 μm or more.

Inner Electrode Layers

The inner electrode layers include a conductive metal. The conductive metal can be a known electrode material, such as, for example, nickel (Ni), copper (Cu), silver (Ag), palladium (Pd), or an alloy including them. From the viewpoint of cost reduction, however, Ni and Cu, which are non-precious metals, are preferable, and Ni is particularly preferred. The inner electrode layers may include extra components, or components other than the conductive metal. An example of an extra component is a ceramic substance that will work as a common material. An example of a ceramic substance is a perovskite oxide, such as, for example, a $BaTiO_3$ compound included in the dielectric ceramic layers.

The thickness of the inner electrode layers is, for example, preferably about 0.20 μm or more and about 0.80 μm or less. By setting the thickness of the inner electrode layers to about 0.20 μm or more, defects such as broken electrodes are reduced. Through the setting of the thickness to about 0.80 μm or less, it becomes possible to limit a decrease in the percentage of the dielectric ceramic layers in the capacitor and the resulting decrease in capacitance. The number of inner electrode layers is, for example, preferably 15 or more and 700 or fewer.

Outer Electrodes

The structure of the outer electrodes can be a known one. For example, the outer electrodes may have a multilayer structure including a substrate layer, a first plating layer, and a second plating layer, with the substrate layer positioned closest to the end surfaces of the multilayer ceramic capacitor. The substrate layer includes metal, such as, for example, nickel (Ni) or copper (Cu). A ceramic powder may be included as a common material besides the metal. The first plating layer is, for example, a nickel (Ni) plating layer. The second plating layer is, for example, a tin (Sn) plating layer. A conductive resin layer may be provided between the substrate layer and the first plating layer. The conductive resin layer is a layer that includes particles of a conductive metal, such as, for example, copper (Cu), silver (Ag), or nickel (Ni), and a resin. The configuration of the outer electrodes is not limited as long as they are electrically coupled to the inner electrode layers and define and function as outer input/output terminals.

(2) Method for Manufacturing the Multilayer Ceramic Capacitor

For the multilayer ceramic capacitor according to the present example embodiment, an example of a manufacturing method is not limited as long as the requirements described above are satisfied. Preferably, however, the multilayer ceramic capacitor is manufactured by the following method. A preferred manufacturing method includes the following steps: a step of producing green sheets including at least a dielectric raw material (green sheet production step), a step of applying a conductive paste to the surface of the green sheets to obtain green sheets with a formed inner electrode pattern (electrode pattern formation step), a step of stacking and pressure-bonding multiple green sheets together to obtain a multilayer block (stacking step), a step of cutting the resulting multilayer block to obtain multilayer chips (cutting step), a step of applying debinding treatment and firing treatment to the resulting multilayer chips to obtain bodies (firing step), and a step of forming outer electrodes for the resulting bodies (outer electrode formation step). During the firing step, firing treatment is applied to the multilayer chips while a pressure of, for example, about 75 MPa to about 100 MPa is applied in the thickness direction. The details of the individual steps will be described below.

Green Sheet Production Step

In the green sheet production step, green sheets including at least a dielectric raw material are produced. The green sheets are precursors to the dielectric ceramic layers of the capacitors and include a raw material for the base component of the dielectric ceramic layers and raw materials for added components. The production of the green sheets can be performed by a known method and is not particularly limited. It only involves preparing a dielectric raw material by mixing the raw materials for added components into the raw material for the base component, slurrying the resulting dielectric raw material by adding a binder and a solvent to it and mixing them together, and shaping the green sheets from the resulting slurry.

The raw material for the base component can be a powder of a perovskite oxide ($ABO_3$), such as, for example, a $BaTiO_3$ compound. The perovskite oxide powder can be synthesized by a known method, such as, for example, solid-phase reaction, hydrothermal synthesis, or alkoxide hydrolysis. The raw materials for added components can be known ceramic raw materials, such as, for example, an oxide, carbonate, hydroxide, nitrate, organic acid salt, alkoxide, and/or chelate compound of the added components (e.g., REs, Mn, Mg, Si, Al, and V).

The mixing of the raw materials can be performed by a known method, with an example being weighing out the raw material for the base component and the raw materials for added components and mixing and grinding them by a wet process, together with a grinding medium and purified water, using a ball mill. When the mixing is performed by a wet process, the resulting mixture can be dried. The slurry formation can also be performed by a known method. It only involves mixing an organic binder and an organic solvent into the dielectric raw material. The organic binder can be a known binder, such as, for example, a polyvinyl butyral binder. The organic solvent can be a known solvent, such as, for example, toluene or ethanol. Additives, such as, for example, a plasticizer, may optionally be added to the slurry. The shaping of the green sheets can be performed by a known approach, such as, for example, doctor blading or RIP.

Electrode Pattern Formation Step

In the electrode pattern formation step, green sheets with a formed inner electrode pattern are produced by applying a conductive paste to the surface of the green sheets. The inner electrode patterns will become inner electrode layers after firing. The conductive metal included in the conductive paste can be a conductive material such as, for example, nickel (Ni), copper (Cu), silver (Ag), palladium (Pd), or an alloy including them. To the conductive paste, a ceramic substance that will work as a common material may be added. The ceramic substance can be the raw material for the base component of the dielectric ceramic layers. The application of the conductive paste can be performed by a known approach, such as, for example, screen printing or gravure printing.

Stacking Step

In the stacking step, a multilayer block is produced by stacking and pressure-bonding multiple green sheets together. This is performed using green sheets with a formed inner electrode pattern, but a subset of them may be green sheets with no formed inner electrode pattern. The stacking and pressure bonding can be performed by a known approach.

Cutting Step

In the cutting step, multilayer chips are produced by cutting the resulting multilayer block. The cutting only needs to be performed in such a manner that chips in a predetermined size will be obtained and that at least part of the inner electrode patterns will be exposed on the end surfaces of the multilayer chips.

Firing Step

In the firing step, bodies are produced by applying debinding treatment and firing treatment to the resulting multilayer chips. Through the firing treatment, the green sheets and the inner electrode patterns are co-sintered, turning into dielectric ceramic layers and inner electrode layers, respectively. The conditions for the debinding treatment can be determined according to the type of organic binder included in the green sheets and the inner electrode patterns. The firing treatment only needs to be performed at a temperature at which the multilayer chips densify sufficiently. For example, it can be performed under conditions under which the multilayer chips are held at a temperature of about 1200° C. or above and about 1300° C. or below for 0 minutes or more and about 30 minutes or less. Moreover, the firing is performed in an atmosphere in which the perovskite oxide as the base component is not reduced and in which the oxidation of the conductive metal is limited. For example, it can be conducted in a $N_2$—$H_2$—$H_2O$ gas stream with a partial pressure of oxygen of about $10^{-10}$ to about $10^{-12}$ MPa. In addition, annealing treatment may be applied after the firing.

In the manufacturing method according to the present example embodiment, the raw material for the base component is a dielectric material having a relatively high degree of crystallization, such as a $BaTiO_3$ with a c-axis/a-axis ratio of, for example, about 1.0085 or greater. In the firing step, the multilayer chips are held at a predetermined temperature for a predetermined duration. After the firing step, pressure is applied in the thickness direction during annealing treatment. By performing annealing treatment at a predetermined temperature while pressing the chips in the stacking direction in such a manner, stress is applied to the crystal grains having a relatively high degree of crystallization, and this stress causes the crystal grains to be rearranged, resulting in the advancement of orientation. The holding temperature is preferably, for example, about 800° C. or above and about 1000° C. or below, and the holding duration (time for which the pressure is applied) is preferably, for example, about 30 minutes or more and 120 minutes or less. The applied pressure is preferably, for example, about 1 MPa or more and about 120 MPa or less. With a pressing pressure of less than about 1 MPa, the rearrangement of the crystal grains is insufficient because the stress is inadequate. In the multilayer ceramic capacitors finally obtained, therefore, the percentage of {100} grains in the dielectric ceramic layers will not be increased. With a pressure of more than about 120 MPa, however, defects in the multilayer chips, such as breakage or chipping, may occur because the pressing pressure is excessively large.

Outer Electrode Formation Step

In the outer electrode formation step, outer electrodes are formed for the resulting bodies. The formation of the outer electrodes can be performed by a known method. For example, they can be formed by applying a conductive paste including one or more metals, such as silver (Ag), copper (Cu), and/or nickel (Ni), to the end surfaces of the bodies, on which the inner electrodes extending to there are exposed, and baking the applied paste. Alternatively, the method of applying a conductive paste to both end surfaces of unfired multilayer chips and applying subsequent firing treatment may also be used. The formed electrodes may be used as substrate layers, and a plating film, for example, of nickel (Ni) or tin (Sn), may be formed on them. Through outer electrode formation in such a manner, multilayer ceramic capacitors are produced.

EXAMPLES

The present invention will be described in further detail using the following examples and comparative examples. The present invention, however, is not limited to the following examples.

(1) Production of Multilayer Ceramic Capacitors [Comparative Examples 1 to 14 and Examples 1 to 7]

As the raw material for the base component, a $Ba_mTiO_3$ powder was prepared. In the formula, m is the A/B molar ratio of the perovskite oxide ($ABO_3$), i.e., the Ba/Ti molar ratio. The $Ba_mTiO_3$ powder was one with a grain diameter D50 of about 140 nm and a c-axis/a-axis ratio of the perovskite structure of about 1.0090, with m being about 1.005. Then the prepared $Ba_mTiO_3$ powder was weighed out, and aggregates were ground through wet-mixing in a ball mill.

Separately from the raw material for the base component, raw materials for added components (for example, Dy, Mg, Mn, Si, Al, and V) were weighed out. The raw materials for added components were, for example, dysprosium oxide ($Dy_2O_3$), magnesium carbonate ($MgCO_3$), manganese carbonate ($MnCO_3$), silicon oxide ($SiO_2$), aluminum oxide ($Al_2O_3$), and vanadium oxide ($V_2O_5$). The weighing out was performed, for example, such that Dy: about 1.0 molar part, Mg: about 0.03 molar parts, Mn: about 0.1 molar parts, Si: about 0.8 molar parts, Al: about 0.08 molar parts, and V: about 0.08 molar parts, all in relation to Ti in the base component: 100 molar parts.

Then the raw materials for added components were added to the raw material for the base component, the materials were wet-mixed using a ball mill, and then the resulting mixture was subjected to drying and heat treatment to give a dielectric raw material. To the resulting dielectric raw material, a polyvinyl butyral binder and ethanol as an organic solvent were added. A slurry was produced by wet-mixing the materials in a ball mill for a predetermined duration. By shaping this slurry into sheets, green sheets for dielectric ceramic layers were produced.

Then a Ni-based conductive paste was applied to the surface of the resulting green sheets by screen printing, and thus conductive paste layers, intended to be inner electrode layers, were formed in patterns. After that, a multilayer block was produced by stacking multiple green sheets with a formed conductive paste layer together, placing a green sheet with no formed conductive paste layer on top of and under the stack, and pressure-bonding the entire workpiece. Subsequently, the resulting multilayer block was cut with a dicing saw into multilayer chips. The stacking was performed such that the end portions to which the conductive paste layers extended would alternate. The cutting, furthermore, was performed such that the conductive paste layers would be exposed on the side surfaces.

To both side surfaces, on which the conductive paste layers were exposed, of the cut multilayer chips, a green sheet for a side margin (side-margin green body) was attached. The production of the green sheets for side margins was conducted in the same or substantially the same manner as that of the green sheets for dielectric ceramic layers.

The multilayer chips with attached side-margin green sheets were fired in a $N_2$—$H_2O$—$H_2$ gas stream under the conditions of a partial pressure of oxygen of, for example, about $1.8 \times 10^{-9}$ to about $8.7 \times 10^{-10}$ MPa, a rate of temperature increase of about 20° C./sec, and a maximum temperature of about 1260° C.×0.5 hours. After the firing, for example, the chips were subjected to annealing treatment in an atmosphere with a partial pressure of oxygen of about $1.0 \times 10^{-12}$ to about 10-15 MPa and at about 800° C. to about 1000° C. while being pressed in the stacking direction. In this manner, bodies of multilayer ceramic capacitors were obtained.

To the end surfaces, to which inner electrode layers extended, of the bodies obtained through the firing, a conductive paste including copper (Cu) as its base component was applied. After that, by baking the applied conductive paste at, for example, about 900° C., a substrate layer of outer electrodes was formed. The surface layer of the substrate layer was subjected to Ni plating and Sn plating in this order by wet-plating. In this manner, multilayer ceramic capacitors were produced.

For the produced multilayer ceramic capacitors, for example, the length L dimension was about 0.4 mm, the dimension in the width direction W was about 0.2 mm, and the dimension in the thickness direction T was about 0.2 mm. In the inner-layer portion, for example, the thickness of the dielectric layers was about 0.5 μm, the thickness of the inner electrode layers was about 0.4 μm, and the number of dielectric ceramic layers was about 150.

(2) EVALUATIONS

For the resulting multilayer ceramic capacitors, the evaluation of different characteristics was conducted as follows.
Dielectric Properties The electrostatic capacitance C of the multilayer ceramic capacitors was measured using an automatic measuring bridge. The measurement was performed under the conditions of a temperature of about 25° C., an effective voltage of about 0.5 Vrms, and a frequency of about 1 kHz. Then, using the electrostatic capacitance C, the relative permittivity ($\varepsilon_r$) of the dielectric ceramic layers was determined. With the relative permittivity value in Comparative Example 1 as a reference, furthermore, the percentage to it was determined as the percentage relative permittivity (percentage $\varepsilon_r$).
High-Temperature Operating Life The multilayer ceramic capacitors were subjected to a highly accelerated life test (HALT) for the determination of the mean time to failure (MTTF). In the highly accelerated life test, a high-temperature load was applied to the multilayer ceramic capacitors under the conditions of about 150° C. and about 6.3 V. Then the mean time to failure (MTTF) was calculated, with the time at which the insulation resistance fell to about 10 kΩ or less considered failure. The sample size was set to ten. With the mean time to failure value in Comparative Example 1 as a reference, furthermore, the percentage to it was determined as the percentage MTTF.
S-TEM Observation A cross-section of the dielectric ceramic layers of a multilayer ceramic capacitor was observed using scanning transmission electron microscope (S-TEM). Prior to the S-TEM observation, a sample for observation was prepared by creating a thin film by the focused ion beam (FIB) technique. Specifically, from the middle of the multilayer ceramic capacitor in the length direction (L direction), a thin-slice sample, with a thickness of 100 nm or less, having a plane including the width direction and the thickness direction (WT plane) was extracted. For this thin-slice sample, its thickness was smaller than the radius of the crystal grains contained in the sample. Then, for 200 crystal grains in the thin-slice sample, a central portion of each crystal grain was observed by scanning transmission electron microscope (S-TEM) under the conditions of a spatial resolution of about 100 pm or less, and analysis by nano beam electron diffraction (NBD) was performed. It should be noted that the S-TEM observation was performed under the following conditions.

Then the number of {100} grains was counted, with grains on which the {100} plane was observed when the sample was inclined within the range of about ±5° identified as {100} grains. For each {100} grain, furthermore, the entire grain was subjected to a S-TEM observation. In the observation, the region in which an array of atoms was observed was identified, and the percentage by area of the atom-arrayed region was calculated. Then the average of the percentages by area of the atom-arrayed region was determined as the average percentage by area. An example of a HAADF image of a region in a {100} grain in which an array of atoms is observed is presented in FIG. 5.

Figure 9:
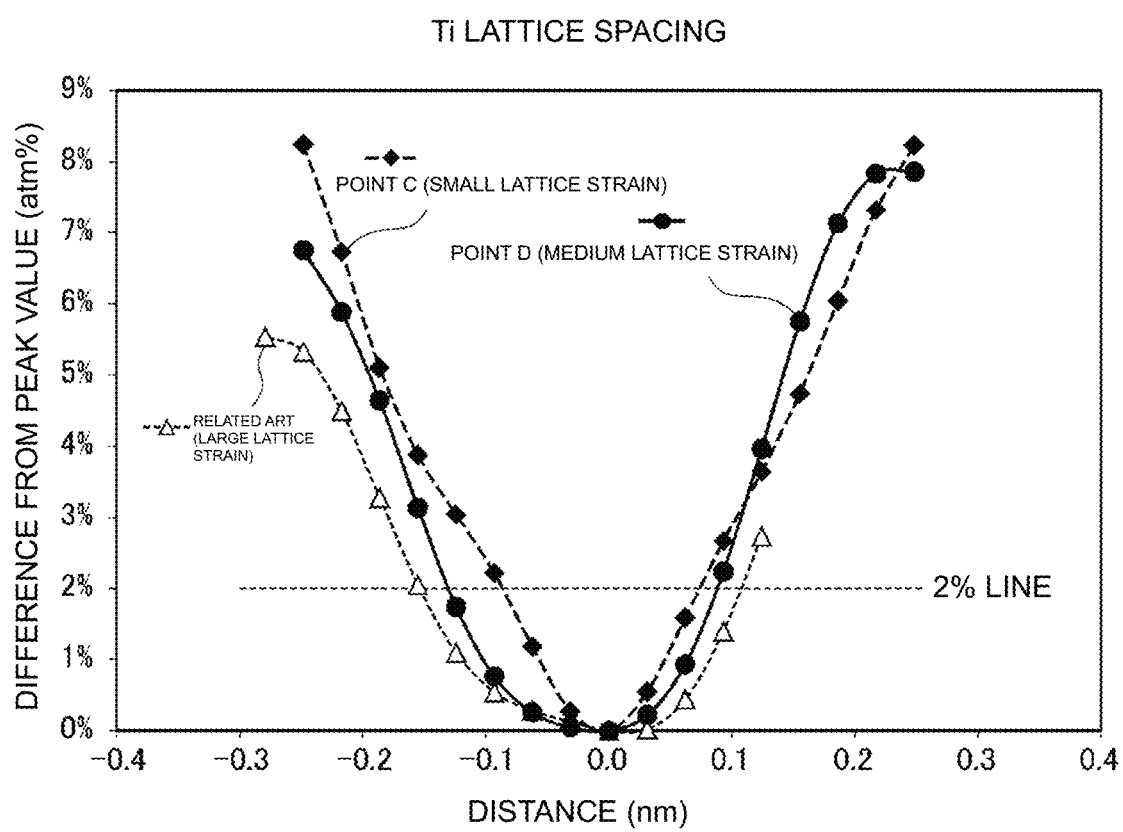
FIG. 9 is a graph that represents positional changes in differential Ti concentration for a one-lattice length.

On the HAADF images obtained, the Ba concentration and Ti concentration on the cross-section of the {100} grain were determined as functions of distance (positional changes) using the EDX system that came with the S-TEM and mapped in a graph. An example of a graph obtained is presented in FIG. 7. In FIG. 7, point A is a point at which the positional changes in Ba concentration are relatively sharp, and point B is a point at which the changes are relatively broad. Point C in FIG. 7 is a point at which the positional changes in Ti concentration are relatively sharp, and point D is a point at which the changes are relatively broad. At points at which the positional changes are sharp, the lattice strain should be small. At points at which the positional changes are broad, by contrast, the lattice strain should be large. Subsequently, for a one-lattice length including points A to D, the differential concentration of each of Ba and Ti ($\Delta c = c_{max} - c$) was determined as a function of distance (positional changes) and mapped in a graph. The graphs obtained are presented in FIGS. 8 and 9. FIGS. 8 and 9 also present results obtained for a $BaTiO_3$ produced in the related art for comparison purposes.

Then, based on the graphs obtained, the area of each of the region in which Ba atoms were distributed and the region in which Ti atoms were distributed ($S_{\Delta c \leq 2\%}$) was determined. Specifically, a line at which the differential Ba concentration ($\Delta c$) was about 2 atm % was drawn parallel or substantially parallel to the horizontal axis. Then the distances from the vertical axis of the two points at which this line intersected the differential Ba concentration graph (point a and point b) were read and designated $d_a$ and $d_b$, respectively. The area of the atom-distributed region ($S_{\Delta c \leq 2\%}$) was then calculated according to formulae (1) and (2) below. The area of the atom-distributed region was calculated for all detected {100} grains, and the average was determined across ten selected grains with the smallest areas.

$$d = \frac{d_a + d_b}{2} \qquad (1)$$

$$S_{\Delta c \leq 2\%} = \pi \cdot d^2 \qquad (2)$$

(3) EVALUATION RESULTS

For Comparative Examples 1 to 14 and Examples 1 to 7, the pressing conditions during firing and the characteristics of the dielectric ceramic layers are summarized in Table 1 below. In Table 1 below, the areas of the region in which Ba atoms were distributed ($S_{\Delta c \leq 2\%}$) are presented. The areas of the region in which Ti atoms were distributed were almost identical to the values for Ba.

accordingly. In particular, in Examples 1 to 7, in which the percentage by number of {100} grains was 17% or more, the relative permittivity was about 3520 or greater.

In Comparative Examples 1 to 14, by contrast, even the highest relative permittivity was about 3540, and the MTTF was only about 37 hours or less.

While example embodiments of the present invention have been described above, it is to be understood that variations and modifications will be apparent to those skilled

TABLE 1

Pressure Application Conditions during Firing and Characteristics of Dielectric Ceramic Layers

| | Pressure application conditions during firing | | | Microscopic structure of dielectric ceramic layers | | | Characteristics of dielectric ceramic layers | | | |
|---|---|---|---|---|---|---|---|---|---|---|
| | Pressure (MPa) | Temperature for application (° C.) | Duration of application (min) | Percentage by number of {100} grains (%) | Average percentage by area of the atom-arrayed region (%) | $S_{\Delta c \leq 2\%}$ (nm$^2$) | $\varepsilon_r$ | Percentage $\varepsilon_r$ (%) | MTTF (hr) | Percentage MTTF (%) |
| Comparative Example 1 | 0 | 800 | 30 | 0 | 0 | ND | 2420 | 100 | 20 | 100 |
| Comparative Example 2 | 0.5 | 800 | 30 | 2 | 0 | ND | 2670 | 110 | 19 | 95 |
| Comparative Example 3 | 1 | 800 | 30 | 4 | 0 | ND | 2920 | 121 | 19 | 95 |
| Comparative Example 4 | 1.5 | 800 | 30 | 7 | 4 | 0.075 | 2950 | 122 | 18 | 90 |
| Comparative Example 5 | 2 | 800 | 30 | 9 | 7 | 0.073 | 3120 | 129 | 20 | 100 |
| Comparative Example 6 | 3 | 800 | 30 | 10 | 9 | 0.072 | 3220 | 133 | 21 | 105 |
| Comparative Example 7 | 3 | 800 | 60 | 10 | 10 | 0.066 | 3240 | 134 | 25 | 125 |
| Comparative Example 8 | 5 | 800 | 30 | 14 | 17 | 0.063 | 3250 | 134 | 25 | 125 |
| Comparative Example 9 | 6 | 800 | 30 | 17 | 29 | 0.055 | 3300 | 136 | 26 | 130 |
| Comparative Example 10 | 6 | 800 | 60 | 18 | 30 | 0.053 | 3540 | 146 | 32 | 160 |
| Comparative Example 11 | 6 | 800 | 90 | 19 | 37 | 0.052 | 3500 | 145 | 31 | 155 |
| Comparative Example 12 | 2 | 1000 | 30 | 9 | 12 | 0.063 | 3210 | 133 | 27 | 135 |
| Comparative Example 13 | 3 | 1000 | 30 | 15 | 30 | 0.060 | 3480 | 144 | 32 | 160 |
| Comparative Example 14 | 6 | 1000 | 30 | 17 | 36 | 0.052 | 3500 | 145 | 37 | 185 |
| Example 1 | 6 | 1000 | 90 | 17 | 39 | 0.050 | 3520 | 145 | 44 | 220 |
| Example 2 | 10 | 1000 | 30 | 20 | 38 | 0.047 | 3550 | 147 | 45 | 225 |
| Example 3 | 15 | 1000 | 30 | 19 | 42 | 0.041 | 3540 | 146 | 47 | 235 |
| Example 4 | 20 | 1000 | 30 | 21 | 44 | 0.037 | 3570 | 148 | 52 | 260 |
| Example 5 | 20 | 1000 | 60 | 20 | 39 | 0.030 | 3540 | 146 | 72 | 360 |
| Example 6 | 20 | 1000 | 90 | 21 | 42 | 0.027 | 3600 | 149 | 77 | 385 |
| Example 7 | 20 | 1000 | 120 | 22 | 44 | 0.021 | 3710 | 153 | 82 | 410 |

Note 1)
"ND" represents not detected.

With increasing applied pressure and extended duration of application during the firing step in the manufacture of the multilayer ceramic capacitors, the area of the atom-distributed region ($S_{\Delta c \leq 2\%}$) decreased, and the high-temperature operating life (MTTF) extended accordingly. In particular, in Examples 1 to 7, in which $S_2$ was about 0.050 nm$^2$ or less, the MTTF was about 44 hours or more, and in Example 7, in which $S_{\Delta c \leq 2\%}$ was about 0.023 nm$^2$ or less, the MTTF was about 82 hours.

With increasing applied pressure and extended duration of application, furthermore, the percentage of {100} grains increased, and the relative permittivity ($\varepsilon_r$) became higher in the art without departing from the scope and spirit of the present invention. The scope of the present invention, therefore, is to be determined solely by the following claims.

What is claimed is:
1. A multilayer ceramic capacitor comprising:
    a first primary surface and a second primary surface opposite to each other in a thickness direction, a first side surface and a second side surface opposite to each other in a width direction, and a first end surface and a second end surface opposite to each other in a length direction; and a body including a plurality of dielectric ceramic layers and a plurality of inner electrode layers stacked in the thickness direction and a pair of outer electrodes provided at the first end surface and the second end surface and coupled to the plurality of inner electrode layers; wherein the plurality of dielectric ceramic layers include crystal grains including a perovskite oxide including at least one A-site element and at least one B-site element;

when a cross-section of the dielectric ceramic layers is observed using a scanning transmission electron microscope, the dielectric ceramic layers include {100} grains, on which a {100} plane of a perovskite structure is observed, as crystal grains; and when compositional analysis of the {100} grains is performed by energy dispersive x-ray spectroscopy on the cross-section, the {100} grains include an atom-distributed region in which a concentration of the A-site element or B-site element (c) subtracted from a maximum concentration of the element ($c_{max}$) ($\Delta c = c_{max} - c$) is about 2 atm % or less, at one or more atomic sites in the grains, and an area of the atom-distributed region ($S_{\Delta c \leq 2\%}$) is about 0.050 nm² or less.

2. The multilayer ceramic capacitor according to claim 1, wherein the area of the atom-distributed region ($S_{\Delta c \leq 2\%}$) is about 0.023 nm² or less.

3. The multilayer ceramic capacitor according to claim 1, wherein a percentage by number of {100} grains in the crystal grains is about 4% or more.

4. The multilayer ceramic capacitor according to claim 3, wherein the percentage by number of the {100} grains is about 15% or more.

5. The multilayer ceramic capacitor according to claim 3, wherein the percentage by number of the {100} grains is about 20% or more.

6. The multilayer ceramic capacitor according to claim 1, wherein, in the cross-section, the {100} grains include an atom-arrayed region in which an atomic arrangement of the perovskite oxide is observed, and an average percentage by area of the atom-arrayed region on cross-sections of the {100} grains is about 10% or more.

7. The multilayer ceramic capacitor according to claim 6, wherein the average percentage by area of the atom-arrayed region is about 20% or more.

8. The multilayer ceramic capacitor according to claim 6, wherein the average percentage by area of the atom-arrayed region is about 30% or more.

9. The multilayer ceramic capacitor according to claim 6, wherein the average percentage by area of the atom-arrayed region is about 40% or more.

10. The multilayer ceramic capacitor according to claim 6, wherein the average percentage by area of the atom-arrayed region is about 50% or less.

11. The multilayer ceramic capacitor according to claim 1, wherein the A-site element includes barium (Ba), and the B-site element includes titanium (Ti).

12. The multilayer ceramic capacitor according to claim 1, wherein the body has a cuboid or substantially cuboid shape.

13. The multilayer ceramic capacitor according to claim 1, wherein a dimension of the multilayer ceramic capacitor in the length direction is about 0.2 mm or more and about 1.2 mm or less, a dimension of the multilayer ceramic capacitor in the width direction is about 0.1 mm or more and about 0.7 mm or less, and a dimension of the multilayer ceramic capacitor in the stacking direction is about 0.1 mm or more and about 0.7 mm or less.

14. The multilayer ceramic capacitor according to claim 1, wherein a percentage of the perovskite oxide in the plurality of dielectric layers is about 50% by mass or more.

15. The multilayer ceramic capacitor according to claim 1, wherein a percentage of the perovskite oxide in the plurality of dielectric layers is about 60% by mass or more.

16. The multilayer ceramic capacitor according to claim 1, wherein a percentage of the perovskite oxide in the plurality of dielectric layers is about 70% by mass or more.

17. The multilayer ceramic capacitor according to claim 1, wherein a percentage of the perovskite oxide in the plurality of dielectric layers is about 80% by mass or more.

18. The multilayer ceramic capacitor according to claim 1, wherein a percentage of the perovskite oxide in the plurality of dielectric layers is about 90% by mass or more.

19. The multilayer ceramic capacitor according to claim 1, wherein each of the plurality of dielectric layers includes at least one of a rare earth element, manganese, magnesium, silicon, aluminum, or vanadium.

20. The multilayer ceramic capacitor according to claim 1, wherein each of the plurality of dielectric layers has a thickness of about 1.0 µm or less.

* * * * *